United States Patent [19]

Takeuchi et al.

[11] Patent Number: 4,890,273
[45] Date of Patent: Dec. 26, 1989

[54] OPTICAL INFORMATION RECORDING/REPRODUCING SYSTEM WITH VARIABLE GAIN SERVO ERROR CORRECTION IN RESPONSE TO DETECTED TRACK FORMATS

[75] Inventors: Toyoaki Takeuchi, Ina; Yoshiaki Ikeda, Hachioji, both of Japan

[73] Assignee: Olympus Optical Co., Ltd., Tokyo, Japan

[21] Appl. No.: 133,156

[22] Filed: Dec. 11, 1987

Related U.S. Application Data

[63] Continuation of Ser. No. 823,850, Jan. 29, 1986, abandoned.

[30] Foreign Application Priority Data

Jan. 31, 1985 [JP] Japan .................................. 60-17556

[51] Int. Cl.$^4$ .............................................. G11B 7/09
[52] U.S. Cl. ...................................... 369/45; 369/44; 369/58; 369/106
[58] Field of Search ................................. 369/43–48, 369/50, 54, 58, 106, 111, 275; 360/77, 77.01, 77.02, 77.03, 77.06, 77.08; 250/201 DF

[56] References Cited

U.S. PATENT DOCUMENTS

| | | | |
|---|---|---|---|
| 4,190,859 | 2/1980 | Kinjo | 369/44 X |
| 4,363,116 | 12/1982 | Kleuters et al. | 369/44 X |
| 4,475,182 | 10/1984 | Hosaka | 369/45 |
| 4,494,154 | 1/1985 | Akiyama | 369/44 X |
| 4,497,047 | 1/1985 | Fujiie et al. | 369/45 |
| 4,535,439 | 8/1985 | Satoh et al. | 369/275 |
| 4,611,317 | 9/1986 | Takeuchi et al. | 369/45 |
| 4,701,603 | 10/1987 | Dakin et al. | 250/201 DF |

Primary Examiner—Alan Faber
Assistant Examiner—W. R. Young
Attorney, Agent, or Firm—Armstrong, Nikaido, Marmelstein, Kubovcik & Murray

[57] ABSTRACT

A focused light beam is projected upon an optical recording medium through an optical system in an optical pickup, and a light reflected from the recording medium is received to detect a focus error signal and a tracking error signal. Further, the focus control and the tracking control are both achieved through a servo feedback loop in response to the detected focus and tracking error signals. In this optical information recording and reproducing system, track formats are provided from which lights of different intensities are reflected, the track formats are discriminated by a projection position detecting circuit, and the focusing and tracking operations are controlled by selectively adjusting the gain of the servo feedback system according to the detected track format, so that the control operation is stable in recording or reproducing information data to or from a recording medium of a high density type, in particular.

6 Claims, 4 Drawing Sheets

OPTICAL INFORMATION RECORDING/REPRODUCING SYSTEM WITH VARIABLE GAIN SERVO ERROR CORRECTION IN RESPONSE TO DETECTED TRACK FORMATS

This application is a continuation of application Ser. No. 823,850 filed Jan. 29, 1986, now abandoned.

BACKGROUND OF THE INVENTION

1. Field of the Invention

The present invention relates to an optical information recording/reproducing system which executes focusing and tracking controls while selectively adjusting the loop gain of a servo feedback system.

2. Description of the Prior Art

Optical information recording/reproducing systems record information data in binary code on an information recording medium depending upon a physical change in such a way that a focused light beam is irradiated upon the medium. Minute recesses, so-called pits, are formed on the recording layer surface of the medium. Also, the magnetization direction is changed on a recording layer surface of a medium which is made of ferromagnetic substance. The generated physical change, representative of recorded information, is reproduced by optically detecting the light reflected from or transmitted through the medium.

In general, a sufficiently strong light beam is required to generate the above-mentioned physical change required in data recording or erasing operation. On the other hand, a light beam not strong enough to generate the physical change is required to reproduce data in the data reproducing operation. In recording information data, predetermined information is first read out from preformat parts where address information has previously been written (when the medium was being formed) and then data is recorded at groove parts, where data have not yet been written on or along tracks arranged on the recording medium. Therefore, it is essential to execute precise tracking control so that a light beam always moves exactly along the groove parts on the guide track in both recording and reproducing operations. Further, it is necessary to execute precise focusing control so that the light beam can always be projected onto the medium sharply in focus.

In general, the above-mentioned tracking control and focusing control are executed under closed loop control. That is, the light obtained when the projected light beam is reflected from or transmitted through the recording medium is detected by a twice or four times-divided photodiode, and an optical system is controlled by feeding back the detected optical signal. In the case of tracking control, in practice, the optical system is controlled in such a way that control current is passed through an actuator for an object lens (or an object mirror) to move the lens in the direction parallel to the medium, that is, to move a carriage on which the lens is mounted by controlling a voice-coil motor. On the other hand, in the case of focusing control, a voice-coil motor is driven to move an optical pickup in the direction perpendicular to the medium or a lens is moved in the direction perpendicular to the medium. These controls are achieved on the basis of the detection signal obtained from the reflected or transmitted light. However, since the intensity of light reflected from or transmitted through the recording medium varies according to various conditions, when the detection signal is simply fed back at a constant feedback ratio in the closed loop control system, the control inevitably becomes unstable due to loop gain variations. The most distinguishable example of difference in the intensity of the reflected or transmitted light is a difference in light beam intensity between recording operation and reproducing operation. This is because the light beam intensity in recording operation is far greater than that in reproducing operation. Therefore, in the case where the detection signal proportional to the reflected or transmitted light intensity in voltage level is simply fed back as it is, the feedback ratio in recording mode is far greater than that in reproducing mode, thus resulting in a problem in that it is impossible to achieve a stable closed loop control. To improve such shortcomings, Japanese Published Unexamined Patent Application No. 56-145533 discloses a control method or system provided with means for adjusting the gain of a closed loop in such a way as to decrease the gain in recording mode and to increase it in reproducing mode, that is, to reduce the difference in feedback ratio between recording and reproducing operations.

However, in the prior art system described above in which only the loop gain is adjusted in recording and reproducing operations, there still exists a problem in that it is impossible to perform a fine gain adjustment, although the loop gain can be adjusted coarsely. This is because the intensity of the reflected light is not constant but changes even during the reproducing operation. The intensity of reflected light is different between when the light beam is being projected upon the preformat part and when it is projected upon the groove part or the data part. Therefore, it is impossible to accurately control the position of the light beam, thus readily causing an offset of light beam travel deviating from the middle position of the recording pits. The above problem eventually lowers the S/N ratio and produces errors in recording or reproducing information data in or from the recording medium, thus reducing the reliability of the system.

Further, in this specification, the above groove part implies an area at which information data has not yet been written and the above data part implies an area (the same position as the groove part) at which information data has already been written.

SUMMARY OF THE INVENTION

With these problems in mind, therefore, it is the primary object of the present invention to provide an optical information recording/reproducing system which can realize stable tracking and focusing controls.

It is another object of the present invention to provide an optical information recording reproducing system which is particularly suitable to an optical system used for a high-density recording medium.

It is still another object of the present invention to provide an optical information recording/reproducing system which can realize highly reliable information recording and reproducing operations.

To achieve the above-mentioned object, the system according to the present invention comprises an optical pickup having light beam projecting means; a focus actuator; a tracking actuator; focus error detecting means; tracking error detecting means; focus error feedback means; tracking error feedback means; in particular, light beam projection position detecting means for determining a kind of projected track formats from or though which lights of different intensities are reflected or transmitted; and gain adjusting means for changing feedback ratio of the focus error signal or the tracking error signal in response to an output signal from said light beam projection position detecting means.

In the system according to the present invention, light reflected from or transmitted through a projection position on a recording medium is received to detect a focus error signal and a tracking error signal; a kind of track formats from or through which lights of different intensities are reflected or transmitted is discriminated by the light beam projection position detecting means; and the focusing and tracking operations are controlled in response to the detected focus and tracking error signals through a servo feedback loop by adjusting the gain of the servo loop according to the detected track format. Since the feedback signal level can be adjusted according to the track format, it is possible to stably control both the focusing and tracking operations, and both the recording and reproducing operations.

BRIEF DESCRIPTION OF THE DRAWINGS

The features and advantages of the optical information recording/reproducing system according to the present invention will be more clearly appreciated from the following description taken in conjunction with the accompanying drawings in which.

DETAILED DESCRIPTION OF THE PREFERRED EMBODIMENTS

Figure 1:
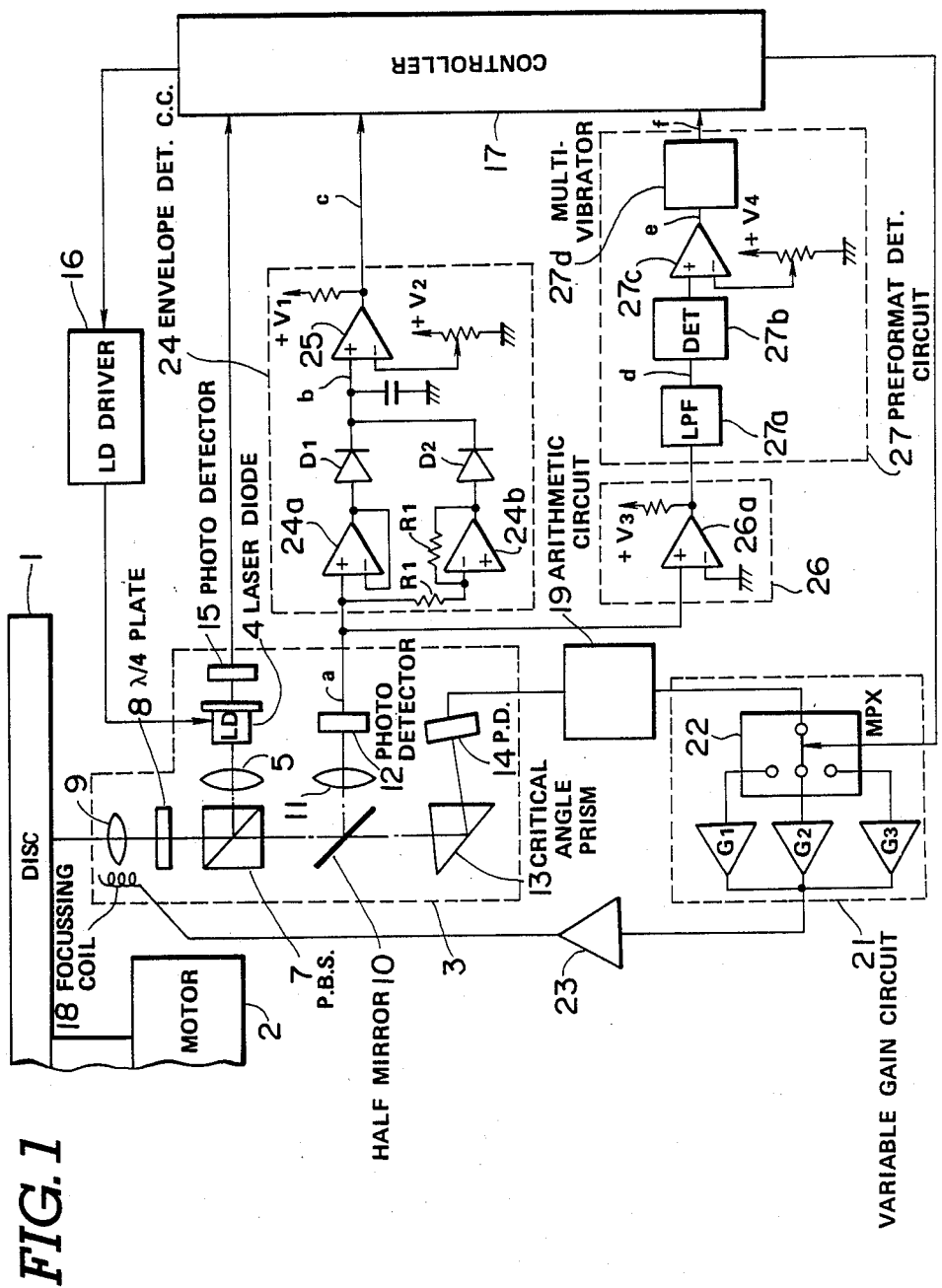
FIG. 1 is a schematic block diagram of a first embodiment of the system according to the present invention.

As shown in FIG. 1, a disc 1 of a recording medium is rotated or driven by a spindle motor 2. An optical pickup 3 is disposed facing the disc 1. An optical system is disposed within this pickup 3 for recording and reproducing information data by focusing a beam and projecting the focused beam upon the disc 1.

The above optical system can be configured, for instance, as follows: A light beam from a laser diode 4 serving as a light source is converted into a parallel beam through a collimator lens 5 and then allowed to be incident upon a polarized beam splitter 7. This beam of p-polarized light, for instance, allowed to be incident upon the polarized beam splitter 7 is reflected therefrom and then converted into a circular polarized light through a quarter wave plate 8, being focused and irradiated upon the surface of the disc 1 through an object lens 9 serving as light beam projecting means. The light beam reflected from the surface of the disc 1 and passed again through the object lens 9 is converted into s-polarized light through the quarter wave plate 8, and becomes incident upon the polarized beam splitter 7. The s-polarized light beam transmitted through this polarized beam splitter 7 is partially reflected from a half mirror 10, then passed through a condenser lens 11, and is received by a photo-detector 12 formed by a pin photodiode for detecting the reproduced signal.

On the other hand, the light beam which is passed through the half mirror 10 is passed through a critical angle prism 13 and then received by a photodetector 14 for detecting a control signal.

The light transmitted through a rear surface of the laser diode 4 is received by a photodetector 15 and supplied to a controller 17 to adjust an output current of a laser diode driver 16 which determines the intensity of light generated from the laser diode 4. The controller 17 compares the peak value of a signal supplied from the photodetector 15 with a reference voltage level and outputs a difference signal between the two to the laser diode driver 16 as a laser output control signal, so that the laser diode 4 generates a stable light output. That is, an automatic light power control mechanism (APC) is formed for stably controlling the output of the laser diode 4.

The object lens 9 is movable in a direction perpendicular to the disc surface in response to a drive signal passed through a focusing coil 18 which forms a focus actuator, so that the light beam can be focused upon the disc 1 as a spot.

To achieve the above focus control of the object lens 9, two-split light outputs detected by a photodetector 14 are applied to an arithmetic circuit 19 including a differential amplifier. By extracting a differential output between the two, it is possible to generate a focus error signal corresponding to an offset value deviated from the focus condition. In this first embodiment, only the focus control will be described for simplification. In the case where the tracking control is added, the photodetector 14 should be formed by four split elements so that the arithmetic circuit 19 can execute necessary calculations to separate a focus error signal and a tracking error signal, respectively, on the basis of four-split light outputs detected by the photodetector 14.

In the case where the intensity of light reflected from the disc 1 is constant without depending upon the recording formats of the disc 1, the gain of a variable gain circuit 21, by which the feedback ratio is determined in feeding back a detected focus error signal to the focusing coil 8, may be switched according to either a recording mode or a reproducing mode. However, in practice, since the intensity of the reflected light changes according to the kind of recording formats, in this first embodiment the gain of the variable gain circuit 21 is changed according to the formats (preformat part, groove part, and data part, described later) from which light beams of different intensities are reflected, so that an appropriate feedback ratio can be obtained. The variable gain circuit 21 is made up of three amplifiers $G_1$, $G_2$ and $G_3$ having different gains respectively and a multiplexer 22 for selectively connecting one of these amplifiers $G_1$, $G_2$ and $G_3$ to the arithmetic circuit 19. Further, this multiplexer 22 is controlled in response to a signal supplied from the controller 17. Here, only the reproducing mode is explained for simplification. In the reproducing/recording mode (not shown), however, the gains are of course switched by the multiplexer 22 in such a way that the gain in the recording mode is markedly reduced as compared with that in the reproducing mode.

The focus error signal adjusted through the variable gain circuit 21 is applied to the focusing coil 18 through a driver 23 to control the movement of the object lens 19 in response to the current passed through the focusing coil 18, so that the focus condition of the light beam irradiated upon the disc 1 can be retained in a correct condition.

As already described, the intensity of light reflected from the disc 1 changes according to the recording formats. On the disc 1, each sector is formed by dividing plural concentrically circular tracks or a spiral track. The recording formats are classified roughly into preformat parts $P_{PR}$ at which address information as to track and sector is written and the succeeding writing parts at which data information is written. The writing parts are further divided into groove parts $P_{GR}$ (nonrecorded area) at which data has not yet been written and data parts $P_{DT}$ (recorded area) at which data has already been written. Therefore, in this first embodiment, the format at which the light beam is currently projected is detected by a projection position detecting means being classified according to preformat part $P_{PR}$, groove part $P_{GR}$ and data part $P_{DT}$. On the basis of the detected signals of the projection position detecting means, a switching signal is applied to the multiplexer 22 in order to select an appropriate amplifier $G_i$ ($i=1, 2$ or 3) corresponding to the intensity of light reflected from the detected format.

Figure 2:
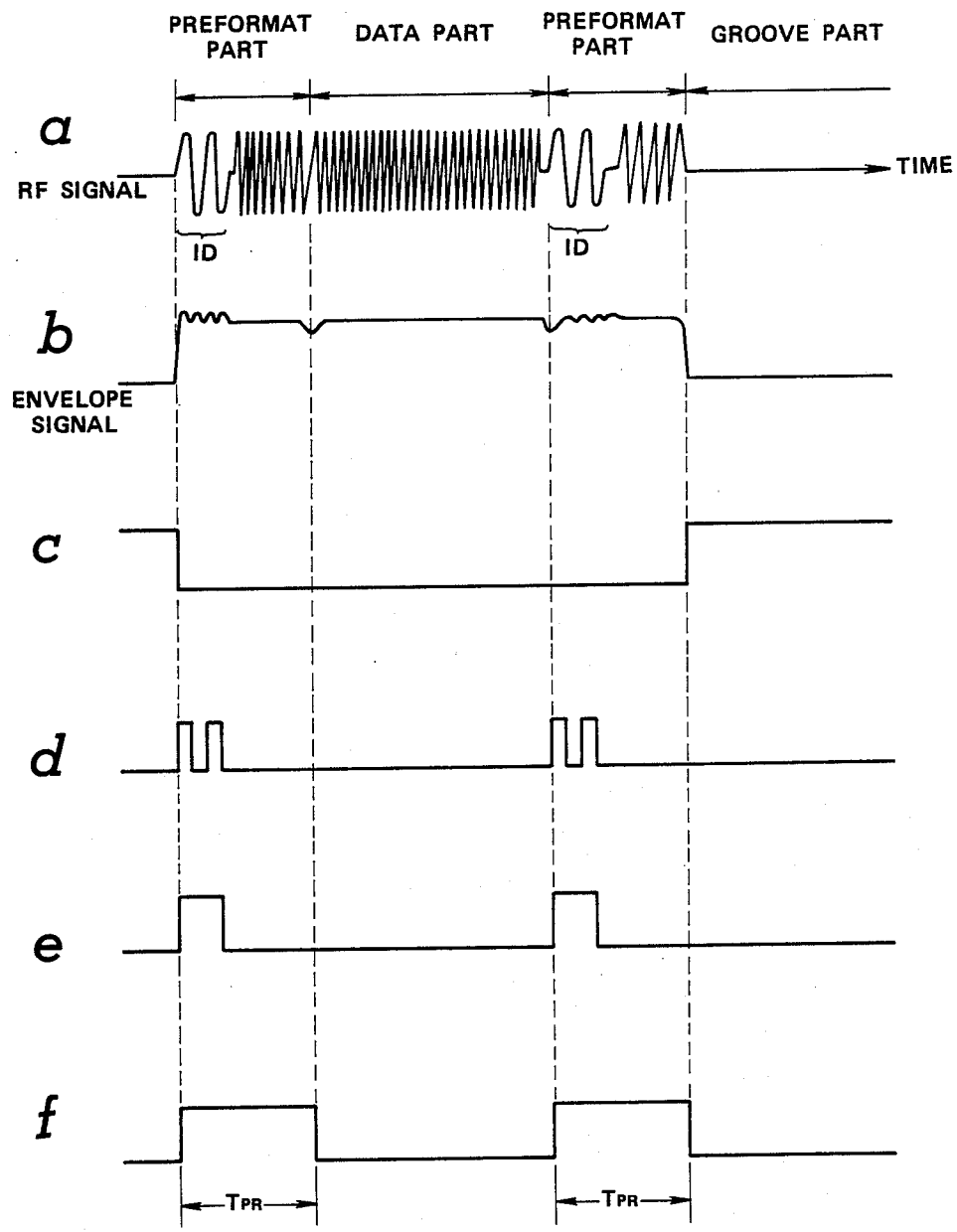
FIG. 2(a-f) is a timing chart representative of each waveform of the system for showing the operation of the system shown in FIG. 1.

In more detail, a signal output received and transduced from light to electricity through the photodetector 12 is a RF (reflection) signal having a waveform as shown in FIG. 2a. As well understood by the drawing, two kinds of sine waves are included because the pit arrangements are different between the preformat part $P_{PR}$ and the data part $P_{DT}$. However, such a signal as described above is never detected in the groove part $P_{GR}$. Further, the preformat part $P_{PR}$ is formed with a code part (referred to as an ID mark) representative of the start of a sector. In this ID mark part, regular recording pits having a constant frequency lower than that in the date part $P_{DT}$, for instance, are formed so as to be distinguishable from the data part $P_{DT}$.

The above RF signal a as shown in FIG. 2a is input to an envelope detection circuit 24 to extract the envelope of this RF signal. In this circuit 24, the positive-side envelope of the RF signal a is extracted through a buffer 24a having a gain of 1 and a diode $D_1$; the negative-side envelope thereof is extracted through an inversion amplifier 24b having a gain of $-1$ and a diode $D_2$. The AC component of the extracted envelope is bypassed through a capacitor C to obtain an envelope signal b as shown in FIG. 2b. This envelope signal b is applied to a comparator 25 to obtain a waveform-shaped pulse signal output C, as shown in FIG. 2c, the voltage of which is at a low level in the preformat part $P_{PR}$ and the data part $P_{DT}$ but is at a high level in the groove part $P_{GR}$, thereafter being supplied to the controller 17.

On the other hand, the output of the photodetector 12 is also applied to a binary circuit 26 to convert the RF signal a as shown in FIG. 2a into binary code. In this embodiment, the binary circuit is composed of a zero-cross comparator 26a, for instance. The output of this binary circuit 26 is applied to a preformat detection circuit 27 to obtain a high-level pulse f only when a preformat part is detected. In this preformat detection circuit 27, the output signal of the binary circuit 26 is passed through a low-pass filter 27a to obtain a signal d representative of ID marks as shown in FIG. 2d. This signal d is applied to a detector 27b and further waveform-shaped through a comparator 27c to output a pulse e having a high level when ID marks are being detected, as shown in FIG. 2e. This pulse e is input to a one-shot multivibrator 27d to output a preformat detection signal f, the voltage level of which is at a high level in response to the leading edge of the pulse e, as shown in FIG. 2f, only during the signal duration $T_{PR}$ of the preformat part $P_{PR}$. The output signal c of the envelope detecting circuit 24 and the output signal f of the preformat detecting circuit 27 are both supplied to the controller 17.

Figure 3:
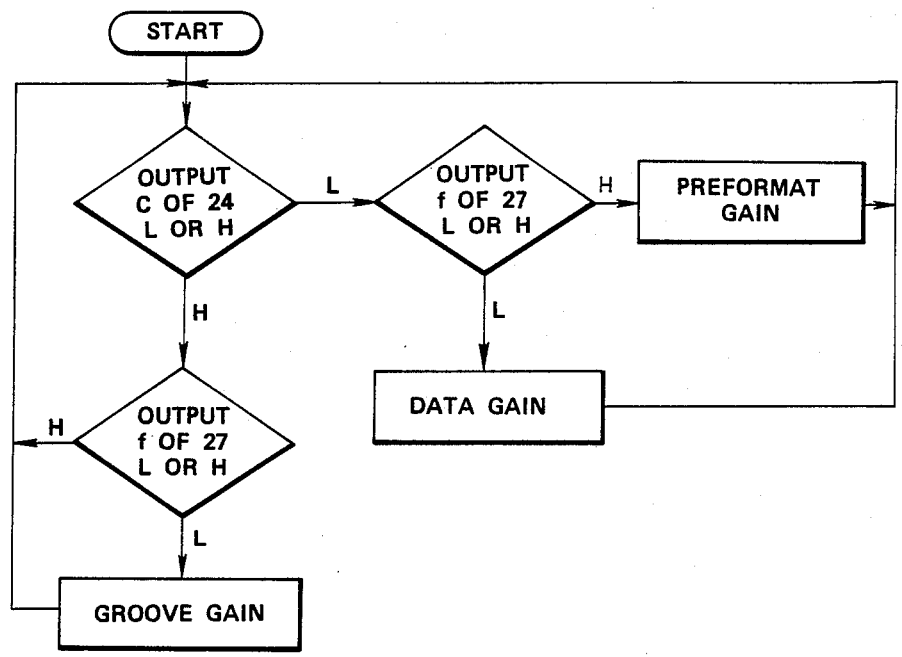
FIG. 3 is a flow chart showing the operation of a controller incorporated in the system shown in FIG. 1.

The controller 17 discriminates format positions upon which the light beam is being projected, that is, the kind of formats on the basis of the signals c and f input thereto in accordance with a flowchart as shown in FIG. 3, and outputs a switching signal to the multiplexer 22.

In FIG. 3, the controller first discriminates whether the output signal c of the envelope detecting circuit 24 is at a high level "H" or a low level "L". If at "L", the controller further discriminates whether the output signal f of the preformat detecting circuit 27 is at "H" or "L". If at "H", the controller determines that these signals c and f represent the preformat part $P_{PR}$ and outputs a digital signal corresponding to this judgement to the multiplexer 22 to set the gain of the variable gain circuit 21 so as to be appropriate to the intensity of light reflected from the preformat part $P_{PR}$.

If the output signal c of the envelope detecting circuit 24 is at "L" and the output signal f of the preformat detecting circuit 27 is also at "L", the controller determines that the signals represent the data part $P_{DT}$, so that the gain or an amplifier $G_i$ is selected in the circuit 21 corresponding to the data part $P_{DT}$.

On the other hand, if the output signal c of the envelope detecting circuit 24 is at "H" and the output signal f of the preformat detecting circuit 27 is at "L", the gain or an amplifier $G_i$ corresponding to groove part $P_{GR}$ is selected.

Further, if the two output signals c and f of the two circuits 24 and 27 are both at "H", control returns to the initial control step. In this case, it is possible to count the number of times that control determines both the signals c and f to be at "H" and to output an error signal in case the number of times exceeds a predetermined value. The controller 17 repeats the above discrimination operation. The controller 17 can be configured by a microprocessing unit or CPU of 8-bit 8085 series, for instance.

In the first embodiment, format parts which reflect lights of different intensities are discriminated and the gain of the control signal (i.e., focus error signal in the first embodiment) is determined so as to be appropriate to the discriminated format part. In other words, the feedback ratio of the control (error) signal is decreased for the format part from which a light of high intensity is reflected but increased for the format part from which a light of low intensity is reflected in order to achieve a stable and accurate feedback control. Therefore, it is possible to prevent the control from becoming coarse and the S/N ratio from being lowered due to a deficiency of loop gain or from becoming unstable out of the normal operation due to an excess of loop gain.

According to the first embodiment, since it is possible to perform a highly precise control, the system is effective particularly when the recording medium is formed in high density, because a high S/N ratio can be maintained and occurrence of error can be reduced in reading information data.

Figure 4:
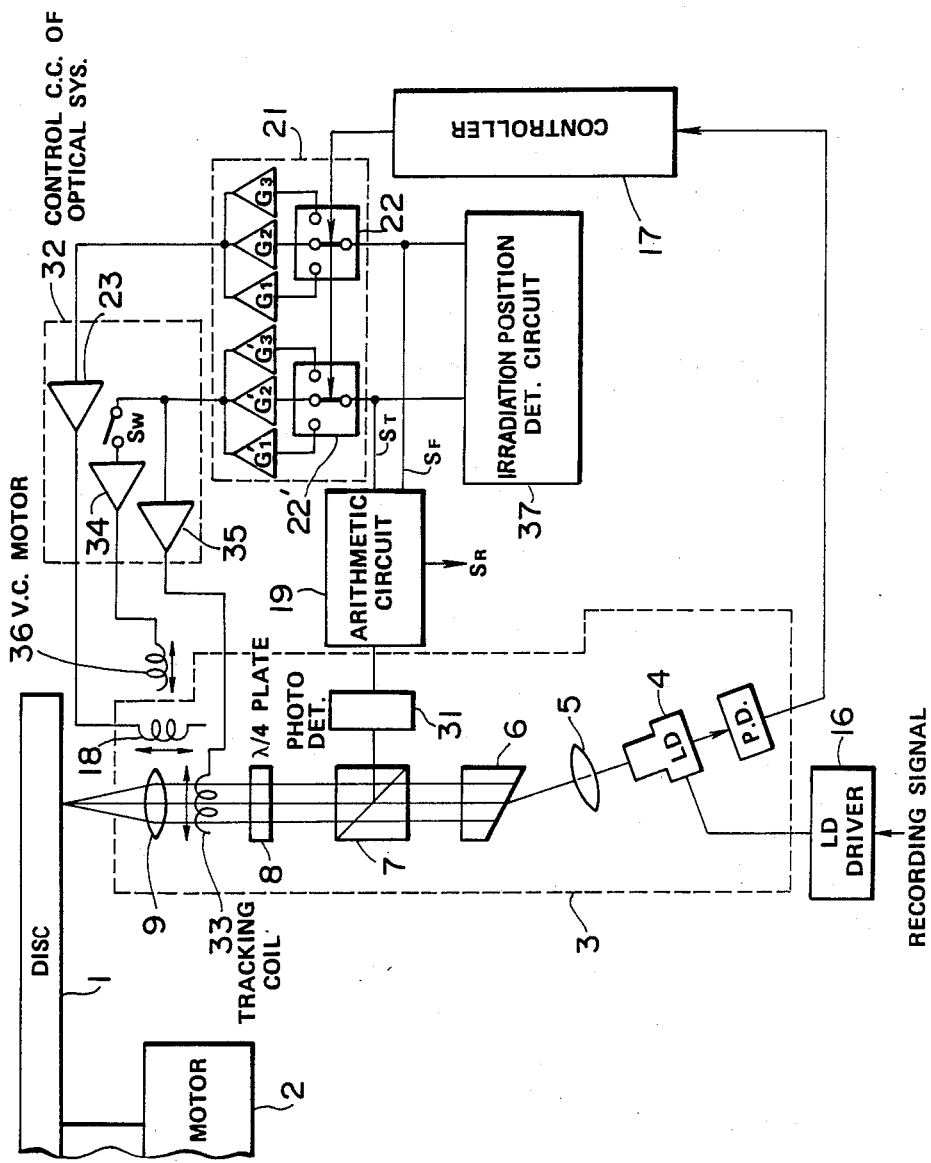
FIG. 4 is a schematic block diagram of a second embodiment of the system according to the present invention.

In the above first embodiment, only the focusing control has been described. However, the feedback ratio of the tracking control system can be controlled simultaneously on the basis of the output of the controller 17. FIG. 4 shows an exemplary circuit configuration for tracking control.

In FIG. 4, an optical pickup 3 different from that shown in FIG. 1 is incorporated in the system. In more detail, a light beam emitted from a laser diode 4 is allowed to be incident upon a waveform shaping prism 6 through a collimator lens 5 to obtain a circular light beam. The circular light beam is passed through a polarized beam splitter 7, a quarter wave plate 8 and an object lens 9 to irradiate a focused beam upon the disc 1. The light beam reflected from the disc 1 is converted through the object lens 9 and the quarter wave plate 8 into a reflected polarized wave, the polarization direction of which is perpendicular to that of the irradiated light. The polarized wave is then reflected from the polarized beam splitter 7 and received by a four-split photodetector 31. The output signal of the photodetector 31 is applied to an arithmetic circuit 19 from which a focus error signal $S_F$, a tracking error signal $S_T$, and a RF signal $S_R$ are separated and output independently. The above focus error signal $S_F$ and the tracking error signal $S_T$ are input to a variable gain circuit 21 to adjust the gain according to the degree of intensity of the reflected light, thereafter being applied to an optical system control circuit 32.

In tracking control, the optical system control circuit 32 outputs through a driver 35 a tracking error signal $S_T$ to a tracking coil 33 forming a tracking actuator in order to finely move the object lens 9 in the direction parallel to the disc surface. Otherwise, in addition to the above fine movement adjustment of the object lens 9, it is possible to move the whole pickup 3 by turning on a switch $S_W$ and by applying a tracking error signal $S_T$ to a voice coil motor 36 through a driver 34. The latter case is called double tracking servo system.

The gain of the variable gain circuit 21 is switched on the basis of switching signals obtained through the projection position detecting circuit 37 (including the envelope detecting circuit 24, the binary circuit 26 and the preformat detecting circuit 27 all shown in FIG. 1) and the controller 17. In this embodiment, since the focusing control and the tracking control are both achieved simultaneously, two sets of three different gain amplifiers $G_1$ to $G_3$ and $G'_1$ to $G'_3$ switched by two multiplexers 22 and 22', respectively, in linkage motion so as to correspond to different intensities of the reflected light.

Further, in this embodiment, a modulation signal is applied to the laser diode 4 through a laser diode driver 16 only in the recording mode to transmit a light beam higher in intensity than in reproducing mode for pit formation, so that a series of pits can appropriately be formed in the disc 1 in response to the recording signal.

Figure 5:
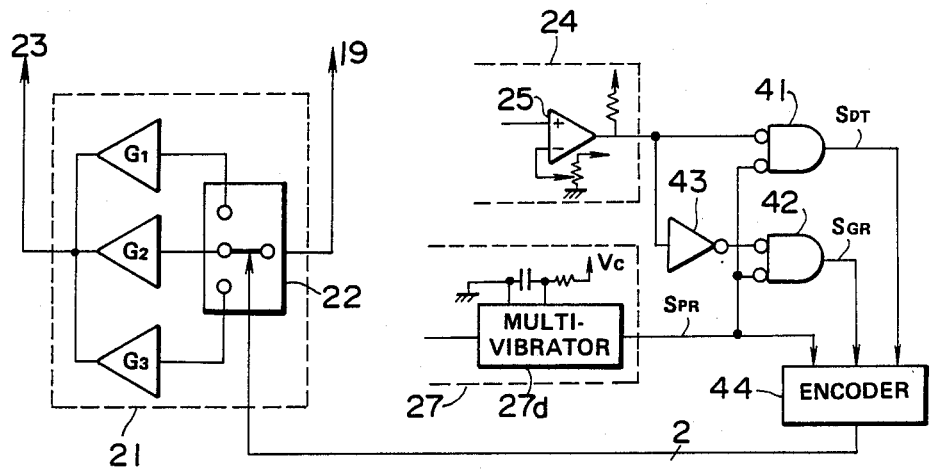
FIG. 5 is a partial schematic block diagram of a third embodiment of the system according to the present invention.

In the above two embodiments, the controller 17 is operated in accordance with software as shown in FIG. 3. However, without being limited to the softwave procedure, it is possible to obtain the similar function by means of a logic circuit configured as shown in FIG. 5. In this case, the preformat detection signal f or $S_{PR}$ obtained by the preformat detecting circuit 27 (shown also in FIG. 1) is input to one input terminal of two two-input NOR gates 41 and 42, respectively, while the pulse signal c obtained by the envelope detecting circuit 24 is input to the other input terminal of the NOR gate 41 and to the other input terminal of the NOR gate 42 through an inverter 43. The output of the NOR gate 41 corresponds to the data part detection signal $S_{DT}$; while the output of the NOR gate 42 corresponds to the groove part detection signal $S_{GR}$. These three detection signals $S_{PR}$, $S_{DTA}$, and $S_{GR}$ are applied to an encoder 44 to generate a multiplexer switching signal.

In the above embodiments, the system has been described in which the disc 1 serving as a recording medium is formed with three formats from which lights of different intensities are reflected. However, without being limited to the disc with three formats, it is evident that the present invention is applicable to any recording medium formed with various formats having different intensities of reflected light. That is to say, even if the intensity of light incident upon a recording medium is constant, the system is so adjusted that the feedback ratio of the control signal for the focusing or tracking control may be decreased when the intensity of reflected light is high but increased when the intensity thereof is low.

Further, in the case where the intensity of light incident upon a recording medium is different between recording mode and reproducing mode (of course, a higher intensity is required in recording mode), the gain of the feedback signal of the control servo loop is reduced (feedback ratio is decreased) in the recording mode as compared with the reproducing mode. Further, the present invention can be applied to any operations of recording, reproducing and erasing.

Furthermore, without being limited to the disc, the present invention can be applied to other recording mediums such as card, other focusing and/or tracking control systems or methods in which the light beam projecting means is made up of a movable mirror instead of an object lens. In addition, the present invention can be applied to the system or method in which a light transmitted through a recording medium is sensed or received by a photodetector without being limited to the case in which a reflected light is received. In this case, the gain is selectively controlled according to the intensity of the transmitted light instead of reflected light. In other words, the present invention can be realized by adjustably controlling the feedback ratio of the servo control loop signal in response to the intensity of light returned from a recording medium in either a reflection system or a transmission system.

What is claimed is:

1. An optical information recording and reproducing system for optically recording information on and reproducing information from an individual recording medium having a plurality of different formats, including at least a prepit part, a groove part before recording data, and a data part after recording data, which are different in the amount of light reflected therefrom or transmitted therethrough in response to different structure of said formats, said system comprising:

an optical pick-up adjustable with respect to said recording medium by at least one of a focusing servo feedback loop and a tracking servo feedback loop, each of said servo feedback loops receiving at least a portion of a received signal reflected from or transmitted through said recording medium and each of said servo feedback loops having variable gain corresponding to each of said plurality of formats and controlled in dependence on said received signals;

format detecting means operatively connected to said optical pick-up for receiving a portion of the received signal therefrom, for detecting each one of said plurality of different formats on said individual recording medium from said received signal; and controller means connected to said format detecting means and to at least one of said servo feedback loops for varying the gain of said at least one servo feedback loop in response to the detection of each said format by said format detecting means.

2. The system as set forth in claim 1, wherein said controller means controls the gain of said servo feedback loops, even if the intensity of projected light onto the recording medium is constant, such that the higher the intensity of the returned light, the lower the gain.

3. The system as set forth in claim 1, wherein the gain of at least one of said servo feedback loops is selectively controlled according to the intensity of light returned from one of the plurality of formats of the recording medium when the plurality of formats include a preformat part at which an address is written, a groove part at which a data has not yet been written, and a data part at which a data has already been written.

4. An optical information recording and reproducing system for optically recording information on and reproducing from an individual recording medium having a plurality of different formats, including at least a prepit part, a groove part before recording data, and a data part after recording data, which are different in the amount of light reflected therefrom or transmitted therethrough in response to different structure of said formats, said system comprising:

an optical pick-up adjustable with respect to said recording medium by at least one of a focusing servo feedback loop and a tracking servo feedback loop, each of said servo feedback loops receiving at least a portion of a received signal reflected from or transmitted through said recording medium and each of said servo feedback loops having variable gain corresponding to each of said plurality of formats and controlled in dependence on said received signals; and controller means, operatively connected to at least one of said servo feedback loops and to said optical pick-up for receiving a portion of the received signal therefrom, for detecting each one of said plurality of formats on said individual recording medium from the received signal, and for varying the gain of said at least one servo feedback loop in response to the detection of each format, wherein said controller means further comprises:

(a) an envelope detecting circuit for detecting an envelope of a light-to-electricity transduced output obtained by receiving the received light from said optical pickup;

(b) a preformat detecting circuit for generating a preformat part detection signal from a received signal from said optical pick-up by outputting a pulse at a beginning of a preformat part of said recording medium; and (c) a logic circuit which receives output signals from said envelope detecting circuit and said preformat detecting circuit, said logic circuit providing an output to each said one servo feedback loop to control the gain thereof.

5. The system as set forth in claim 4, wherein said logic circuit includes a microcomputer.

6. An optical information recording and reproducing system for optically recording information on and reproducing information from an individual recording medium having a plurality of different formats, including at least a prepit part, a groove part before recording data, and a data part after recording data, said system comprising:

an optical pick-up adjustable with respect to said recording medium by at least one of a focusing servo feedback loop and a tracking servo feedback loop, each of said servo feedback loops receiving at least a portion of a received signal reflected from or transmitted through said recording medium and each of said servo feedback loops having variable gain corresponding to each of said plurality of formats and controlled in dependence on said received signals;

controller means, operatively connected to at least one of said servo feedback loops and to said optical pick-up for receiving a portion of the received signal therefrom, for detecting each one of said plurality of different formats on said individual recording medium from said received signal, and for varying the gain of said at least one servo feedback loop in response to the detection of each said format;

wherein said controller means includes means for varying the gain of at least said one servo feedback loop for recording medium surfaces on said individual recording medium reflecting or transmitting different amounts of light.

* * * * *